US011543341B2

(12) United States Patent
Chu et al.

(10) Patent No.: US 11,543,341 B2
(45) Date of Patent: Jan. 3, 2023

(54) PARTICLE DISCRIMINATION AND CLASSIFICATION BY MULTIPLE-WAVELENGTH LIGHT SCATTERING

(71) Applicant: Nanozen Industries Inc., Vancouver (CA)

(72) Inventors: Chu-Hui Winnie Chu, Vancouver (CA); Amin Engarnevis, Vancouver (CA); Jingwen Li, Montreal (CA)

(73) Assignee: Nanozen Industries Inc., Vancouver (CA)

( * ) Notice: Subject to any disclaimer, the term of this patent is extended or adjusted under 35 U.S.C. 154(b) by 0 days.

(21) Appl. No.: 17/687,532

(22) Filed: Mar. 4, 2022

(65) Prior Publication Data
US 2022/0283075 A1   Sep. 8, 2022

Related U.S. Application Data

(60) Provisional application No. 63/157,500, filed on Mar. 5, 2021.

(51) Int. Cl.
*G01N 15/14* (2006.01)

(52) U.S. Cl.
CPC . *G01N 15/1434* (2013.01); *G01N 2015/1493* (2013.01)

(58) Field of Classification Search
CPC ............. G01N 15/1434; G01N 2015/1493
USPC .......... 356/335–343, 432–444, 243.2–243.8, 356/250, 356
See application file for complete search history.

(56) References Cited

U.S. PATENT DOCUMENTS

| | | | |
|---|---|---|---|
| 5,760,900 A * | 6/1998 | Ito | G01N 15/1434 356/73 |
| 5,999,250 A | 12/1999 | Hairston et al. | |
| 7,106,442 B2 | 9/2006 | Silcott et al. | |
| 7,525,660 B2 | 4/2009 | Gigioli et al. | |
| 7,551,277 B2 | 6/2009 | Cole | |
| 9,835,552 B2 * | 12/2017 | Wagner | G01N 21/532 |
| 10,823,659 B2 | 11/2020 | Li | |
| 2015/0131099 A1 * | 5/2015 | Tahara | G01N 15/1427 356/442 |

FOREIGN PATENT DOCUMENTS

CA           2490201 A1    12/2003

* cited by examiner

*Primary Examiner* — Tri T Ton
(74) *Attorney, Agent, or Firm* — Oyen Wiggs Green & Mutala LLP

(57) ABSTRACT

Methods and apparatus for classifying and/or discriminating particles in an aerosol. An example method involves delivering a flow of the aerosol through a nozzle into a sampling volume and directing a plurality of light beams onto an interaction plane in the sampling volume. The plurality of light beams may each be made up of light having one of a corresponding plurality of different wavelengths. For example, the wavelengths may include wavelengths of visible and infrared light or visible, near infrared and short wave infrared light. The method may detect intensities of light from the plurality of light beams that has been scattered at the interaction plane by particles of the aerosol at a plurality of different scattering angles. The resulting data is processed to characterize and/or discriminate the particles.

16 Claims, 11 Drawing Sheets

PARTICLE DISCRIMINATION AND CLASSIFICATION BY MULTIPLE-WAVELENGTH LIGHT SCATTERING

CROSS-REFERENCE TO RELATED APPLICATIONS

This application claims priority from U.S. application No. 63/157,500 filed 5 Mar. 2021 and entitled PARTICLE DISCRIMINATION AND CLASSIFICATION BY MULTIPLE-WAVELENGTH LIGHT SCATTERING which is hereby incorporated herein by reference for all purposes. For purposes of the United States of America, this application claims the benefit under 35 U.S.C. § 119 of U.S. application No. 63/157,500 filed 5 Mar. 2021 and entitled PARTICLE DISCRIMINATION AND CLASSIFICATION BY MULTIPLE-WAVELENGTH LIGHT SCATTERING.

FIELD

The present invention relates to methods and apparatuses for optically detecting and classifying particles in aerosols. An example application is monitoring air quality.

BACKGROUND

An aerosol is a suspension of particles in the atmosphere or another gas. Governments and industry are increasingly interested in monitoring aerosol concentrations and identifying the compositions of aerosols. Aerosols may result from natural events, e.g. Asian dust, or human activity, e.g. byproducts of manufacturing. Monitoring aerosols is important for various reasons including assessing health risks. The United States Environmental Protection Agency (EPA) has specified ambient air quality standards for particle size and mass as they relate to health issues such as asthma, emphysema, and other respiratory diseases; both the particle size and identification of the particles have become important. Particle measurement and differentiation has also become important in manufacturing. Many manufacturing processes produce aerosols, beyond any effects on health and safety, monitoring aerosols in industrial settings can help to optimize industrial processes (e.g. to ensure proper operation of equipment and procedures).

One technique for monitoring aerosols is to collect aerosol particles on filters, which are then analyzed in the laboratory. While accurate for the most part, this method lacks time resolution. Also, laboratory testing is time consuming, expensive, and usually relies on human operators.

Increasingly optical particle detectors based on the optical measurement of Mie scattering have been used because of their ease of operation, lower cost, and the ability to perform real-time aerosol monitoring.

Optical particle detectors which operate on the basis of Mie light scattering typically include a laser diode that emits a light beam that crosses a flow of air. When a particle in the flow crosses the light beam Mie scattering or reflecting occurs. The scattered or reflected light is detected by a photo-diode. The size of the particle is typically determined based on the maximum pulse height. Particle concentrations are determined by the number of light bursts over given periods of time.

Some optical particle detectors provide two light beams that cross a flow of air at spaced apart locations. Such detectors allow the mass density of a particle to be inferred by time-of-flight measurements which compare the time between pulses caused by the particle when the particle crosses the first and second light beams.

Particle counters which rely on pulse height measurements cannot distinguish between particles of different types, for two examples, Arizona road dust and Lactose particles. Another problem encountered by current optical Mie based particle counters is the lack of range for small, sub 10 µm particles and the inability to distinguish the particle types.

There remains a need for practical and cost-effective particle detectors. There is a particular need for such particle detectors that are capable of identifying particles of different types (e.g. different materials) as well as monitoring particle numbers, sizes, and/or mass density.

SUMMARY

This invention has several aspects. These include, without limitation: methods for characterizing aerosol particles; apparatus for characterizing aerosol particles; tangible computer readable media carrying machine executable instructions for processing light scattering data to characterize aerosol particles; and optical detector assemblies useful for characterizing aerosol particles. Some embodiments detect, classify and/or discriminate aerosols having sizes in the range of sub-micron to 20 microns or more (e.g. sizes in a range of about 0.6 µm or 0.1 µm to about 20 µm, 40 µm, 45 µm or 50 µm).

One aspect of the present invention provides apparatus for discrimination and classifying particles by analyzing light scattered by the particles. The apparatus detects light of different wavelengths that is scattered from the particles and exploits the property that the scattering intensity varies with scattering angle in different ways for light of different wavelengths and for particles of materials that have different refractive indices. Scattering of light of different wavelengths at different angles provides a fingerprint which may be used to identify the type of particle interrogated as well as its size. Measurements of time-of-flight between two light beams provides information which may be applied to estimate an interrogated particle's mass density.

Apparatus according to some embodiments of the current invention uses at least two laser diodes which emit light in the visible near infrared spectrum (Vis-NIR) and at least one detector responsive to only the Vis-NIR spectrum.

The Mie scattering range is generally restricted to particles having sizes that are no more than about 10-20 times the illumination wavelength. Particles having sizes beyond this range fall into the Fraunhofer range in which scattered intensities are relatively independent of the particle refractive index. Some embodiments include a third laser diode, which emits light in the short-wave infrared (SWIR) spectrum together with one or more additional detectors that detect SWIR light scattered by particles. Such embodiments may usefully extend the size range of particles that can be discriminated/classified. In some embodiments the additional detector(s) are responsive only to light in the SWIR range.

The light beams used are collimated to focus at a particle interaction plane in a testing chamber through which aerosol is drawn by a pump at a configured flow rate. The Vis-NIR beams are collimated to be nonintersecting and separated by a fixed distance at the particle interaction plane so that a particle entering the testing chamber will be illuminated by a first beam (e.g. the Vis Red beam and subsequently by a second beam (e.g. the NIR beam) as the particle passes through the testing chamber. The detector(s) responsive to the Vis-NIR light range will first receive a light pulse resulting from the interaction of the particle with the first beam and then a second light pulse resulting from the interaction of the particle with the second beam. Thus, time-of-flight measurement through the Vis-Red and IR beams can be obtained.

According to one preferred embodiment of the present invention a multi-wavelength apparatus operates at three different wavelengths to characterize/discriminate particles having sizes in the range of 1-20 µm.

Another aspect of the invention provides an apparatus for detecting or characterizing particles in aerosols. The apparatus may comprise a testing chamber. The apparatus may also comprise a nozzle arranged to direct an aerosol stream to flow along a path in the testing chamber. The apparatus may also comprise a light source operable to emit first and second beams of light which are respectively directed to illuminate the path at first and second spaced apart locations. The first and second beams respectively may comprise light of first and second different wavelengths. The apparatus may also comprise at least one light detector configured to detect light scattered by one or more particles in the aerosol stream as the one or more particles pass through the first and second beams of light. The apparatus may also comprise a data processor configured to process an output of the at least one detector to detect or characterize the one or more particles in the aerosol stream.

In some embodiments, the first beam of light comprises red visible light and the second beam of light comprises near infrared light.

In some embodiments, the first beam of light has a wavelength of about 660 nm and the second beam of light has a wavelength of about 780 nm.

In some embodiments, the light source comprises a dual-wavelength laser diode.

In some embodiments, the light source comprises a plurality of closely spaced light emitters.

In some embodiments, the plurality of closely spaced light emitters comprises a plurality of closely spaced individual light emitting diodes.

In some embodiments, the first and second locations are spaced apart by a distance in the range of about 100 µm to about 1000 µm.

In some embodiments, the first and second locations are spaced apart by a distance of about 200 µm.

In some embodiments, the first and second locations are spaced apart by a distance of about 660 µm.

In some embodiments, the apparatus comprises collimation optics arranged to collimate the first and second beams of light.

In some embodiments, the collimation optics comprise a lens positioned between the light source and the path of the aerosol stream, the lens configured to collimate the first and second beams of light.

In some embodiments, the at least one detector selectively responds to light scattered from the first and second beams of light and is insensitive to light outside of a wavelength range that includes the first and second wavelengths.

In some embodiments, the at least one detector comprises a silicon Vis-Nir detector.

In some embodiments, the at least one detector comprises a first plurality of detectors arranged to detect light from the first and second beams of light that is scattered at a corresponding plurality of different scattering angles by particles in the aerosol stream.

In some embodiments, the data processor is connected to receive a respective output of each of the first plurality of detectors and to process the outputs of the first plurality of detectors to detect or characterize particles in the aerosol stream.

In some embodiments, each of the detectors has a planar light detecting surface that is oriented parallel to directions in which the first and second beams of light are incident on the path of the aerosol stream.

In some embodiments, the first plurality of detectors comprises a first detector positioned to detect light scattered at a scattering angle of about 30 degrees, a second detector positioned to detect light scattered at a scattering angle of about 90 degrees and a third detector positioned to detect light scattered at a scattering angle of about 120 degrees.

In some embodiments, each of the detectors of the first plurality of detectors is spaced apart along a line that is parallel to one of the first and second beams of light or to a line that has an angle relative to an axis of the testing chamber that is between angles of the first and second beams of light relative to the axis of the testing chamber.

In some embodiments, the apparatus comprises a third light source operable to emit a third beam of light directed to illuminate the path In some embodiments, the third beam of light comprises light having a longer wavelength than light of the first and second beams of light.

In some embodiments, the additional light source comprises a short wave infrared (SWIR) laser diode.

In some embodiments, the third beam of light has a wavelength in the range of 800-1700 nm.

In some embodiments, the apparatus comprises third beam collimation optics arranged to collimate the third beam of light.

In some embodiments, the third beam collimation optics comprises a lens located between the third light source and path of the aerosol stream.

In some embodiments, the third beam of light is incident on the path of the aerosol stream in a path that is angled relative to the paths of the first and second beams of light.

In some embodiments, the at least one detector is insensitive to light from the third light source.

In some embodiments, the apparatus comprises at least one additional detector configured to detect light from the third beam of light that is scattered by particles in the aerosol.

In some embodiments, the data processor is configured to receive an output of the at least one additional detector and to process the output of the at least one additional detector in combination with an output of the at least one detector to detect or characterize particles of the aerosol stream.

In some embodiments, the at least one additional detector comprises an InGaAs detector.

In some embodiments, the at least one additional detector has a response range of about 800 nm to about 1700 nm.

In some embodiments, the at least one additional detector comprises a second plurality of detectors arranged to detect light scattered by particles in the aerosol stream at a corresponding plurality of scattering angles.

In some embodiments, the data processor is configured to receive respective outputs of each of the detectors of the second plurality of detectors and to process the respective outputs to detect or characterize the one or more particles in the aerosol stream.

In some embodiments, the second plurality of detectors comprises a first detector positioned to detect light scattered at a scattering angle of about 30 degrees, a second detector positioned to detect light scattered at a scattering angle of about 90 degrees and a third detector positioned to detect light scattered at a scattering angle of about 120 degrees.

In some embodiments, each of the detectors of the second plurality of detectors is spaced apart along a line that is parallel to the third beam of light.

In some embodiments, each of the detectors of the second plurality of detectors has a planar light detecting surface that is oriented parallel to directions in which the third beam of light is incident on the path of the aerosol stream.

In some embodiments, the data processor is configured to one or more of: detect pulses that correspond to particles of the aerosol stream scattering light to the at least one light detector; measure amplitudes of the pulses; and determine a time interval τ between the first and second pulses respectively corresponding to one particle scattering light from the first and second beams of light.

In some embodiments, the data processor is configured to process outputs of the at least one detector and to compute one or more of: a number of particles that has passed through the testing chamber in a given time period; sizes of the particles; velocities of the particles in the aerosol stream; densities of the particles; coefficients of refraction of the particles; volume density of the particles; and compositions of the particles.

In some embodiments, the data processor is configured to determine properties or characteristics of the one or more particles by comparing measured data against simulated data.

In some embodiments, the simulated data comprises one or more evaluation tables and comparing the measured data against the simulated data comprises searching each of the one or more evaluation tables for a best match to the measured data to determine particle size, refractive index and/or mass density of the one or more particles.

In some embodiments, the measured data comprises measured scattered intensities and time interval τ between pulses.

In some embodiments, the data processor is configured to search the one or more evaluation tables for the best match by minimizing a matching function for each evaluation table.

In some embodiments, the data processor is configured to minimize a value of the matching function by minimizing an evaluation parameter F wherein F is defined as:

$$F = \sum_{k=1}^{N} \left\{ \frac{1}{I_{ti}} |I_i - I_{ti}| \right\}$$

wherein N is the number of detectors and $I_i$ and $I\tau_i$ are the measured and theoretical calculated scattered intensities at specific wavelengths and angles.

In some embodiments, the matching function incorporates a weighting factor representing an accuracy and confidence level for the output of each of the one or more detectors.

In some embodiments, the best match corresponds to the match with the smallest matching function value.

In some embodiments, the best match is at least in part selected based on time of flight measurements.

In some embodiments, the apparatus comprises a pump that is operable to draw the aerosol stream through the testing chamber.

In some embodiments, the pump is configured to draw the particulate bearing aerosol stream through the testing chamber at a flow rate in the range of about 1 L/min to about 5 L/min.

In some embodiments, the apparatus comprises a nozzle. The nozzle may be configured to accelerate the aerosol stream.

In some embodiments, the apparatus comprises a source of sheath air directed to form a sheath extending around the aerosol stream.

In some embodiments, the processor is configured to process output signals from the plurality of detectors to provide estimates of: refractive index, particle size and particle density by searching a data structure that associates sets of refractive index, particle size and particle density to a corresponding set of expected output signals to identify one of the corresponding sets of expected output signals that most closely matches the output signals from the plurality of detectors.

In some embodiments the at least one detector comprises a first plurality of detectors arranged to detect light from the first and second beams of light that is scattered at a corresponding plurality of different scattering angles by particles in the aerosol stream. For example, in some embodiments the first plurality of detectors comprises a first detector positioned to detect light scattered at a scattering angle of about 30 degrees, a second detector positioned to detect light scattered at a scattering angle of about 90 degrees and a third detector positioned to detect light scattered at a scattering angle of about 120 degrees.

In some embodiments the apparatus comprises a third light source operable to emit a third beam of light directed to illuminate the path of the aerosol stream wherein the third beam of light comprises light having a longer wavelength than light of the first and second beams of light. In some such embodiments the apparatus comprises at least one additional detector configured to detect light from the third beam of light that is scattered by particles in the aerosol wherein the additional detector is sensitive to the light of the third beam of light and insensitive to the light from the first and second beams of light and the data processor is configured to detect or characterize the one or more particles in the aerosol stream based at least in part on an output of the at least one additional detector. In some embodiments The at least one additional detector comprises a second plurality of detectors arranged to detect light scattered by particles in the aerosol stream at a corresponding plurality of scattering angles. In some embodiments each of the first plurality of detectors and/or each of the second plurality of detectors is respectively operative to detect light scattered by the particles of the aerosol stream into a corresponding range of scattering angles which spans 2 to 8 degrees. In some embodiments these ranges respectively include scattering angles of 30, 90 and 120 degrees.

In some embodiments the processor is configured to process output signals from the plurality of detectors to provide estimates of: refractive index, particle size and particle density by searching a data structure that associates sets of refractive index, particle size and particle density to a corresponding set of expected output signals to identify one of the corresponding sets of expected output signals that most closely matches the output signals from the plurality of detectors. In some such embodiments the sets of expected output signals comprise expected times of flight for particles to pass from the first location to the second location and the data processor is configured to process the output signals from the plurality of detectors to determine a time of flight for a specific particle between the first and second location and to identify the one of the corresponding sets of expected output signals that most closely matches the output signals from the plurality of detectors based in part on comparison of the determined time of flight to the expected times of flight.

In some embodiments the data processor is configured to determine particle statistics for the aerosol stream including one or more of: a size distribution of particles in the aerosol stream, a density distribution of particles in the aerosol stream, and an index of refraction distribution of particles in the aerosol stream.

Another aspect of the invention provides a method for detecting or characterizing particles in an aerosol. The method may comprise drawing a particulate bearing aerosol stream through a testing chamber. The method may also comprise illuminating the aerosol stream with a first beam of light and a second beam of light. The first and second beams of light may respectively comprise light of first and second wavelengths and may be directed to illuminate the aerosol stream at respective first and second spatially separated locations. The method may also comprise detecting light from the first and second beams of light that has been scattered by particles of the aerosol stream. The method may also comprise processing the detected scattered light to detect or characterize the one or more particles in the aerosol stream.

In some embodiments, the first beam of light comprises red visible light and the second beam of light comprises near infrared light.

In some embodiments, the first beam of light has a wavelength of about 660 nm and the second beam of light has a wavelength of about 780 nm.

In some embodiments, the first and second locations are spaced apart along the aerosol stream by a distance in the range of about 100 μm to about 1000 μm.

In some embodiments, the first and second beams of light are collimated.

In some embodiments, the method comprises collimating the first and second beams of light with a lens positioned between a first light source and the testing chamber.

In some embodiments, the method comprises detecting intensity of light scattered by particles in the aerosol stream from each of the first and second beams of light at a plurality of scattering angles.

In some embodiments, the method comprises detecting the light scattered by the first and second beams of light at first, second and third detectors, each of the first, second and third detectors respectively operative to detect light scattered by the particles into a corresponding range of scattering angles.

In some embodiments, the range of scattering angles for each of the first, second and third detectors spans in the range of 2 to 8 degrees.

In some embodiments, the plurality of scattering angles include scattering angles of about 30 degrees, about 90 degrees and about 120 degrees.

In some embodiments, the method comprises: illuminating the aerosol stream with a third beam of light; and detecting light from the third beam of light scattered by the particles in the aerosol stream.

In some embodiments, the third beam of light comprises light having a third wavelength that is longer than the first and second wavelengths.

In some embodiments, the third beam of light is collimated.

In some embodiments, illuminating the aerosol stream with the third beam of light comprises directing the third beam of light at an angle relative to the paths of the first and second beams of light.

In some embodiments, detecting light scattered from the third beam of light by the particles in the aerosol stream comprises detecting the light scattered from the third beam of light by one or more additional detectors that is insensitive to the light of the first and second beams of light.

In some embodiments, detecting the light scattered from the third beam of light comprises detecting the light scattered from the third beam of light at first, second and third additional detectors, each of the first, second and third additional detectors respectively operative to detect light scattered from the third beam of light by the particles into a corresponding range of scattering angles.

In some embodiments, processing the detected scattered light to detect or characterize the one or more particles in the aerosol stream further comprises one or more of: detecting pulses that correspond to the one or more particles in the testing chamber scattering light; measuring amplitudes of the pulses; and determining a time interval τ between the pulses resulting from one particle of the one or more particles crossing the first and second beams of light.

In some embodiments, processing the detected scattered light to detect or characterize the one or more particles in the aerosol stream generates one or more of: a number of particles that has passed through the testing chamber in a given time period; sizes of the one or more particles; velocities of the one or more particles as they travel between the first and second beams of light; densities of the one or more particles; coefficients of refraction of the one or more particles; volume density of the one or more particles; and particle compositions.

In some embodiments, the method comprises comparing measured data against simulated data to determine properties or characteristics of the particles in the aerosol stream.

In some embodiments, the simulated data comprises one or more evaluation tables and comparing measured data against the simulated data comprises searching each of the one or more evaluation tables for a best match against the measured data to determine particle size, refractive index or mass density of the one or more particles.

In some embodiments, the measured data comprises measured scattered intensities and time interval τ between pulses.

In some embodiments, searching the one or more evaluation tables for the best match comprises minimizing a matching function for each evaluation table.

In some embodiments, minimizing the matching function comprises minimizing an evaluation parameter F wherein F is defined as:

$$F = \sum_{k=1}^{N} \left\{ \frac{1}{I_{ti}} |I_i - I_{ti}| \right\}$$

wherein N is the number of detectors and $I_i$ and $I\tau_i$ are the measured and theoretical calculated scattered intensities at specific wavelengths and angles.

In some embodiments, the matching function incorporates a weighting factor representing an accuracy and confidence level of each detector.

In some embodiments, the best match corresponds to the match with the smallest matching function.

In some embodiments, the best match is at least in part selected based on time of flight measurements.

In some embodiments, the aerosol stream is drawn into the testing chamber at a flow rate in the range of about 1 L/min to about 5 L/min.

In some embodiments, the method comprises preventing recirculation of the particulate bearing aerosol stream within the testing chamber using sheath air or focusing inlet conditions.

In some embodiments, the method comprises processing the detected intensities of light scattered by particles in the aerosol stream from each of the first and second beams of light at the plurality of scattering angles to provide estimates of: refractive index, particle size and density of the particles by searching a data structure that associates sets of refractive index, particle size and density to a corresponding set of expected output signals to identify one of the corresponding sets of expected intensities of light scattered by particles in the aerosol stream from each of the first and second beams of light at the plurality of scattering angles that most closely matches the detected intensities of light scattered by particles in the aerosol stream from each of the first and second beams of light at the plurality of scattering angles.

Further aspects and example embodiments are illustrated in the accompanying drawings and/or described in the following description.

It is emphasized that the invention relates to all combinations of the above features, even if these are recited in different claims.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
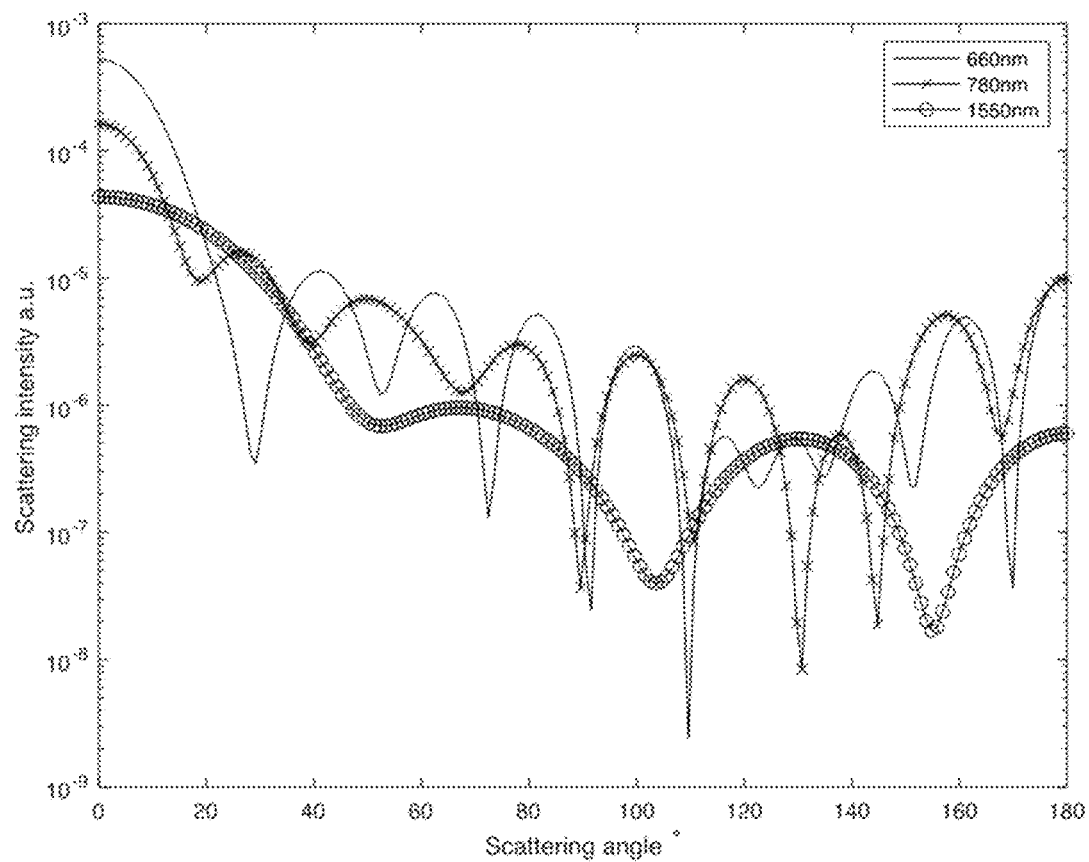
FIG. 1 is a graph which shows Mie scattered intensities for a 2 µm particle as a function of scattering angles for several wavelengths.
Figure 2:
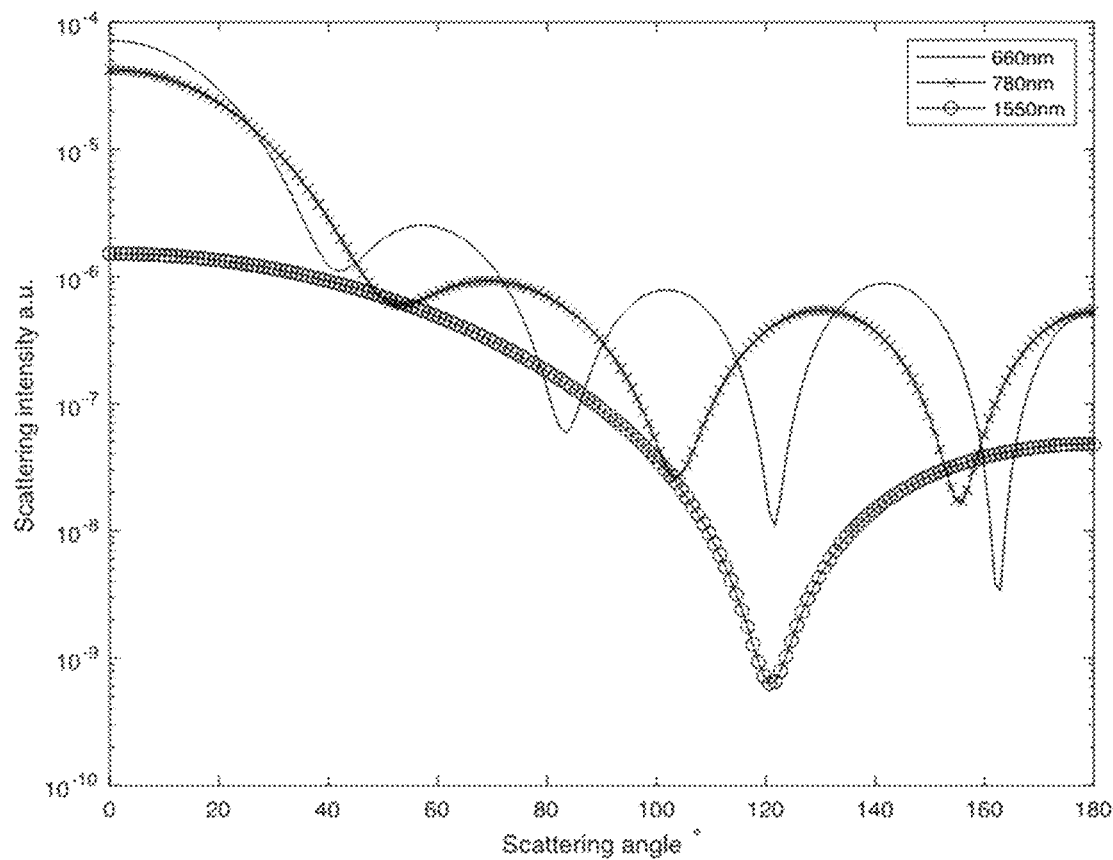
FIG. 2 is a graph which shows Mie scattered intensities for a 1 µm particle as a function of scattering angles for several wavelengths.

FIG. 1 and FIG. 2 are graphs which show Mie scattering intensity as a function of scattering angle for particles having a refractive index (RI) of 1.5 at wavelengths of 660 nm, 780 nm, and 1550 nm. The scattering angle is measured relative to an incident light beam with 0 degrees corresponding to light that is backscattered and 180 degrees corresponding to light that is forward scattered in the direction of the incident light beam. In some embodiments scattered light is detected by a fixed flat-surface light detector such as a photo-diode. In some embodiments the surface of the photodiode is oriented so that it is parallel to an incident light beam.

The curves shown in FIGS. 1 and 2 are the results of simulations. FIG. 1 shows results for a particle having a diameter of 2 µm and FIG. 2 shows results for a particle having a diameter of 1 µm.

Each of FIGS. 1 and 2 demonstrate that the way that scattering intensity varies with scattering angle is wavelength dependent. By comparing FIG. 1 and FIG. 2, one can see that for smaller particles the difference in scattering intensity for different wavelengths becomes more pronounced.

Figure 3:
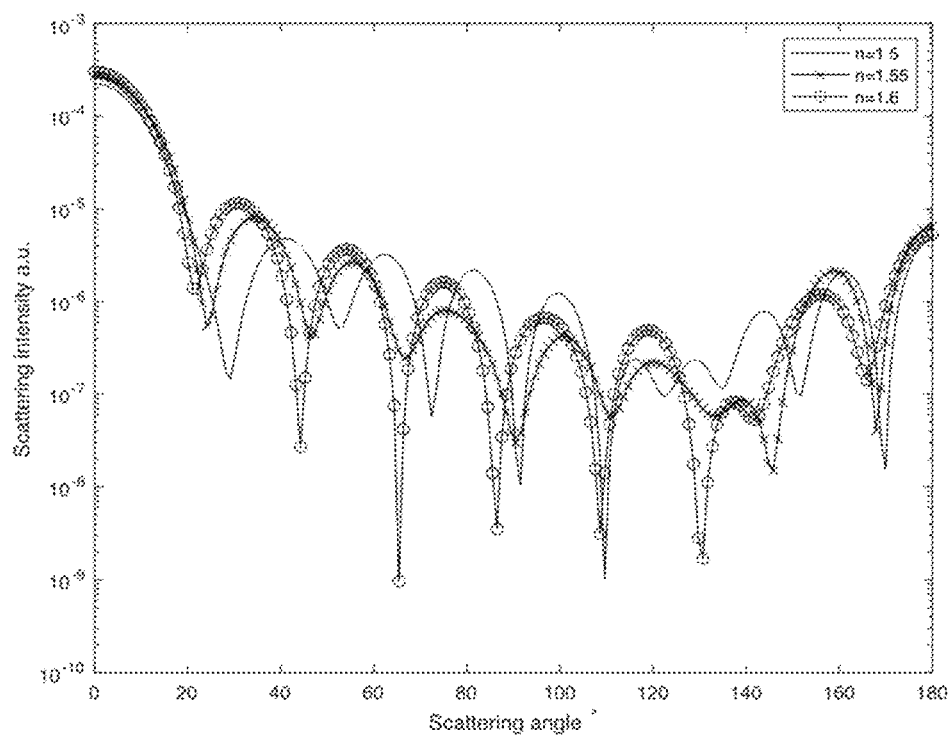
FIG. 3 is a graph which shows Mie scattered intensities of light having a wavelength of 660 nm as a function of scattering angle for 2 µm particles having several different refractive indices.
Figure 4:
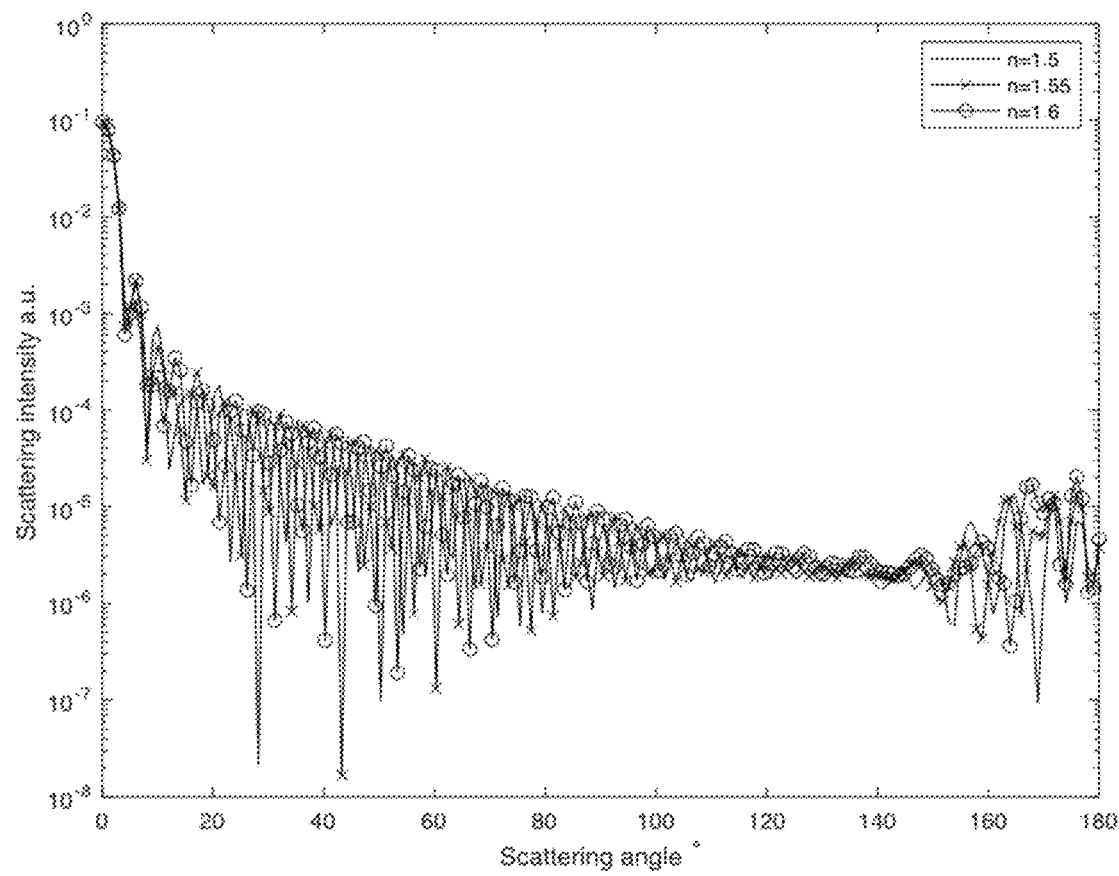
FIG. 4 is a graph which shows Mie scattered intensities of light having a wavelength of 660 nm for a 10 µm particle as a function of scattering angle.

FIGS. 3 and 4 are graphs which show Mie scattering intensity as a function of scattering angle for particles of different RIs (i.e., 1.5, 1.55, 1.6) illuminated by light having a wavelength of 660 nm. The curves shown in FIGS. 3 and 4 are the results of simulations. FIG. 3 is for the case where the particle has a diameter of 2 µm. FIG. 4 is for the case where the particle has a diameter of 10 µm, which is almost beyond the Mie scattering range.

Each of FIGS. 3 and 4 show that changes in the RI result in changes to the way that scattering varies as a function of angle. Comparing FIGS. 3 and 4 shows that for larger particles it is harder to differentiate between particles of different refractive indices based on the respective patterns of scattering intensity vs. scattering angle.

Figure 5:
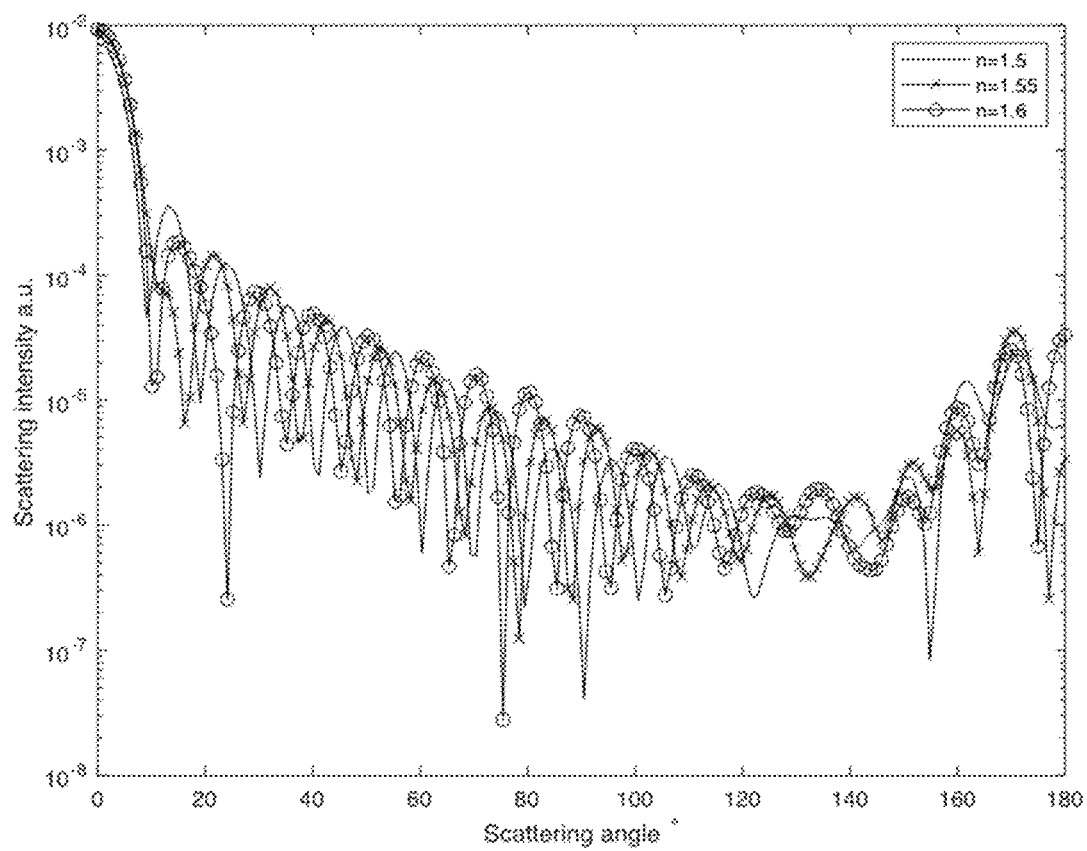
FIG. 5 is a graph which shows Mie scattered intensities of light having a wavelength of 1550 nm for a 10 µm particle as a function of scattering angle.
Figure 6:
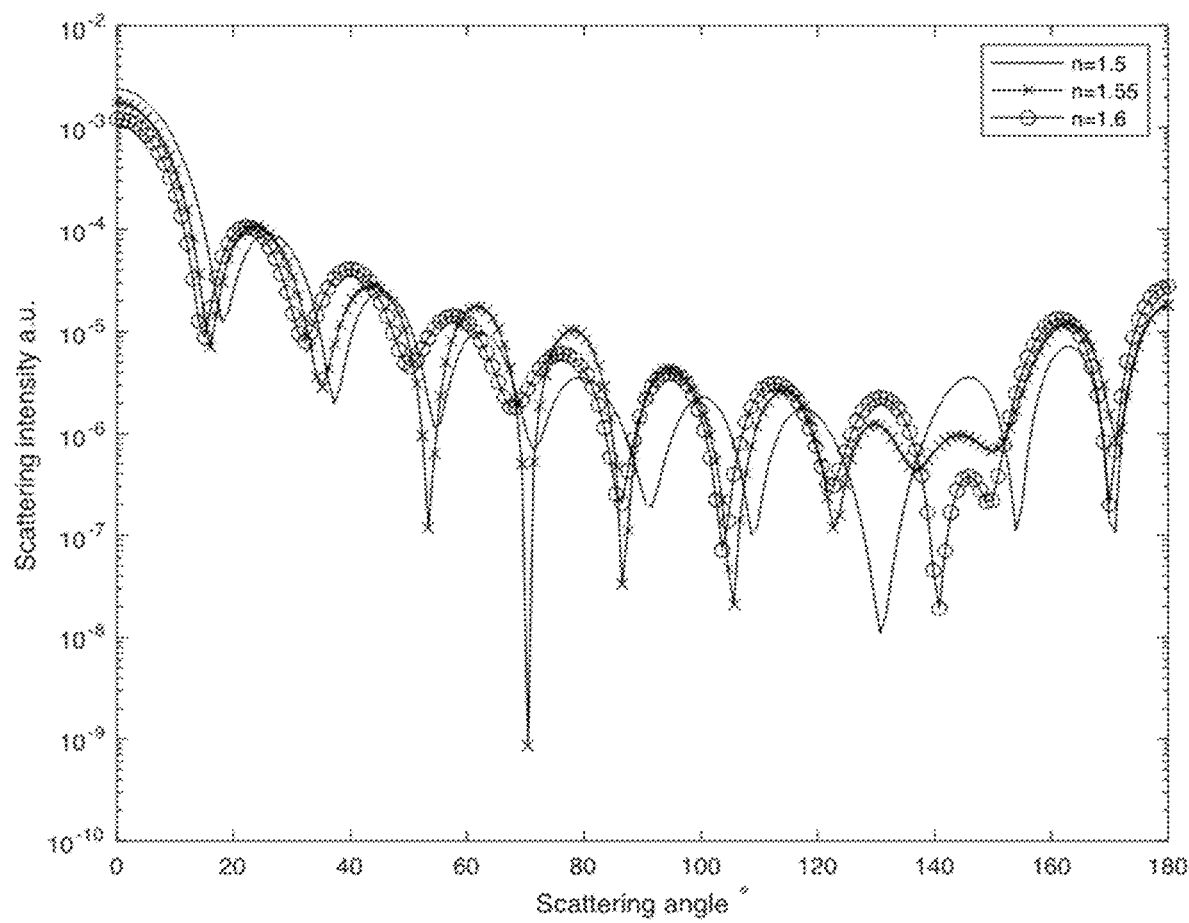
FIG. 6 is a graph which shows Mie scattered intensities of light having a wavelength of 2750 nm for a 10 µm particle as a function of scattering angle.

FIGS. 5 and 6 are graphs which show Mie scattering intensity for wavelengths of 1550 nm and 2750 nm respectively as a function of scattering angle for 10 µm diameter particles of different RIs (i.e., 1.5, 1.55, 1.6). FIGS. 5 and 6 are the results of simulations. By comparing FIGS. 4, 5 and 6 one can see that for larger particles, it is possible to more easily differentiate particles of different RI based on the way that scattering intensity varies with scattering angle when longer wavelengths of light are used.

The inventors have determined that it is possible to differentiate particles of different refractive indices and type, e.g. Lactose, RI 1.53, mass density 1.525 g/cm$^3$ from Arizona road dust, RI 1.51, mass density 2.65 g/cm$^3$ by monitoring scattering intensities at different angles while illuminating the particles with light of different wavelengths and processing the results of the monitoring.

Figure 7:
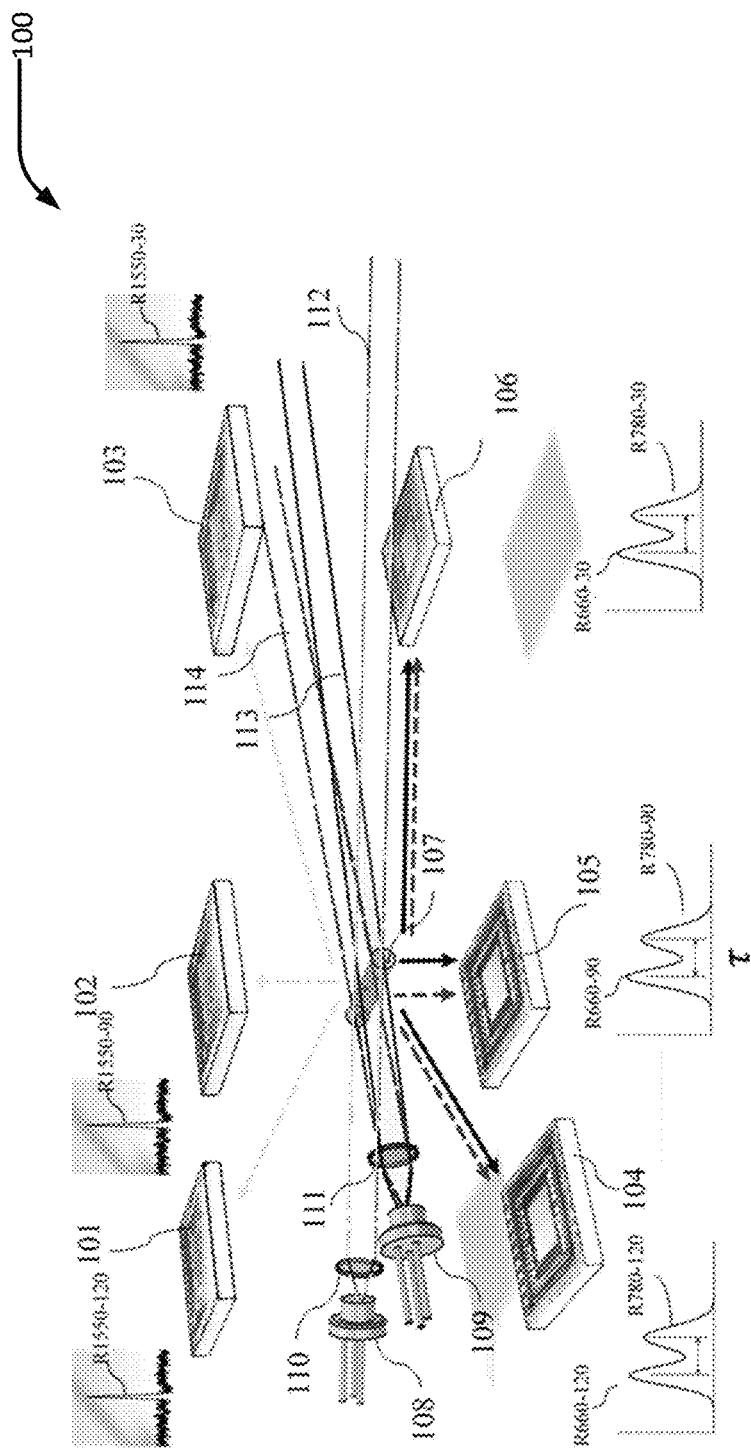
FIG. 7 is a schematic view of an example apparatus according to an embodiment of the current invention which uses light of three wavelengths and includes six light detectors.

FIG. 7 is a schematic view of apparatus 100 according to an example embodiment of the present invention. Apparatus 100 creates a particulate bearing aerosol stream in a sampling volume 107. Those conversant with the art of Mie scattering based particle detectors will understand that a suitable particulate bearing aerosol stream may be caused by operating a pump (not shown) to draw the stream into and through sampling volume 107. By operating the pump at a specified flowrate, the volume of air or other gas being sampled per unit of time may be accurately estimated and the velocity of the stream flowing through sampling volume 107 may be estimated and used to estimate particle densities using time-of-flight measurements as described below. For example, the stream may carry in the range of about 1 to 5 L/min through sampling volume 107.

The flowrate may be selected so that the particles in the stream flowing in the rough sampling volume 107 are spread out sufficiently to keep a rate of coincidence errors sufficiently small. Sheath air or focusing inlet conditions may be used to prevent recirculation of sampled aerosols in sampling volume 107. The flowrate will be highly dependent on the application, i.e. the particle types and suspected concentrations.

Apparatus 100 illuminates particles in sampling volume 107 with at least two wavelengths of light. For example the light may be provided by a dual-wavelength laser diode assembly 109. In an example embodiment laser diode assembly 109 emits Vis RED 660 nm beam 114 and an NIR 780 nm beam 113. According to one embodiment of the current invention a dual-wave-length laser-diode assembly such as LNCT28PS01WW is used. A lens 111 collimates beams 113, 114. In some embodiments lens 111 is a lens as described in U.S. patent Ser. No. 10/823,659.

Other closely spaced light sources may be used in place of a dual wavelength laser diode assembly 109. For example individual light emitting diodes may be spaced closely together using surface mounting technology. Beams emitted by such closely-spaced light emitting diodes may be collimated by single lens 111 into beams 114 and 113 that are separated at a particle interaction plane within sampling volume 107 (described below with reference to FIG. 8).

Beams 113 and 114 are collimated so that they are separated by a small distance at the particle interaction plane. For example, Vis RED beam 114 and NIR beam 113 may be collimated to be separated nominally by a distance in the range of 100 µm to 1000 µm. For example, beams 113, 114 may be separated by distances of 200 µm or 660 µm at the particle interaction plane in sampling volume 107.

Light detectors are positioned to detect light from beams 113, 114 that is scattered at different angles by particles at the particle interaction plane. In the embodiment shown in FIG. 7, three light detectors 104, 105, and 106 are positioned to capture light scattered by a particle passing through the beams 114 and 113. Light detectors 104, 105, 106 may be designed/positioned to respond only to light scattered from beams 113, 114. For example, light detectors 104, 105, 106 may be silicon Vis-Nir detectors. An example of a suitable light detector is the FDS100 silicon photodiode available from Thorlabs™. The FDS100 is a high-speed silicon photodiode with a spectral response range of 350 nm-1100 nm and an active area of 3.6 mm×3.6 mm.

As described, dual-wavelength laser diode assembly 109 with its associated detectors 104, 105, and 106 may operate well for monitoring smaller particles (e.g. particles having sizes in the range of about 0.1 µm or 1 µm to about 20 µm). Apparatus 100 optionally includes an additional light source 108 which emits light having a wavelength longer than the wavelengths emitted by dual-wavelength laser diode assembly 109. Additional light source 108 and associated detectors as described below can help to extend the particle size range for which apparatus 100 can characterize the particles that pass through sampling volume 107.

In one preferred embodiment, light source 108 is a SWIR (short wave infrared) laser diode which emits a beam 112 collimated by a lens 110 to interact with particles at the plane of interaction within sampling volume 107. In some embodiments, light source 108 is operative to emit a beam of light having a wavelength in the range of 800-1700 nm.

Apparatus 100 includes light detectors positioned to detect light from beam 112 that has been scattered by particles in sampling volume 107. Detectors 101, 102 and 103 are shown in FIG. 7. Detectors 101, 102 and 103 are sensitive to the light from light source 108 and may be insensitive to the light from light source 109. For example, light detectors 101, 102 and 103 may be InGaAs detectors positioned to capture light scattered by a particle within sampling volume 107. Light detectors 101, 102 and 103 may be designed/positioned so that they respond only to light of beam 112. An example of a suitable type of light detector to use for detectors 101, 102 and 103 is the model FGA21 available from Thorlabs™ which has a response range of 800-1700 nm and an active diameter of 2 mm.

In some embodiment beam 112 is not parallel to either of beams 113 and 114. For example, beam 112 may pass through sampling volume 107 at an angle (e.g. an angle of a few degrees) relative to the paths of beams 113 and 114. In some such embodiments light detectors 101, 102, 103 are spaced apart along a line that is parallel to beam 112 while light detectors 104, 105, 106 are spaced apart along a line that is parallel to one of beams 113 and 114 or to a line that has an angle relative to an axis of sampling volume 107 that is between angles of beams 113 and 114 relative to the axis of sampling volume 107.

As discussed previously with respect to FIGS. 1-6, the scattered light intensities at the angles received by detectors 101, 102, 103 or 104, 105, 106 represent a finger-print of the particles that can be used for particle differentiation.

Detectors 101-106 are placed to receive light scattered by particles at specific angles. For example, detectors 101 and 104 may be positioned to detect light scattered at the plane of interaction at an angle of about 30 degrees, detectors 102 and 105 may be positioned to detect light scattered at angles of about 90 degrees, and detectors 103 and 106 may be positioned to detect light scattered at angles of about 120 degrees. In practice each of light detectors 101-106 may capture light scattered from sampling volume 107 within a small range of angles (e.g. a range of 2 to 8 degrees). For example light detector 105 which is placed to capture light scattered at an angle of 90 degrees may capture light scattered in the angular range of 88 to 92 degrees.

FIG. 7 shows simulated examples of captured light intensity as a function of time when a particle passes through sampling volume 107 for detectors 101, 102, 103 and 104, 105, 106. Detectors 101, 102 and 103 are each shown with a graph of detected 1550 nm light vs. time in which an intensity pulse indicates the presence of a particle. Information about the composition of the particle may be determined from the amplitudes of the pulses detected by detectors 101-106.

For each particle that passes through sampling volume 107, each of light detectors 104-106 detects two pulses as shown in the simulated graphs of intensity vs. time for detectors 104, 105, 106 shown in FIG. 7. A first one of the two pulses is caused when the particle scatters light from beam 114. A second one of the two pulses is caused when the particle scatters light from beam 113. The time interval τ between the first and second pulses indicates the velocity of the corresponding particle.

In some embodiments, outputs of each of the light detectors (e.g. detectors 101 to 106) are recorded and processed. For example the outputs of these light detectors may be digitized and the digitized outputs of the light detectors may then be processed by a suitable data processor. The processing may, for example, comprise:

detecting pulses that correspond to particles in sampling volume 107 scattering light to the light detectors;

measuring amplitudes of the pulses;

determining the time interval τ between the pulses resulting from one particle crossing beams 114 and 113.

Processing of the signals from detectors 101, 102, 103, 104, 105 and 106 may, for example generate data such as one or more of:

a number of particles that has passed through sampling volume 107 in a given time period;

sizes of the particles;

velocities of the particles as they travel between beams 114 and 113;

densities of the particles;

coefficients of refraction of the particles;

volume density of the particles;

particle compositions;

particle statistics (e.g. size distributions, density distributions, index of refraction distributions);

combinations of two or more of these.

The processed data may be displayed, stored, printed transmitted or otherwise made available for use by people or automated systems.

Apparatus as described herein may include any suitable data processor. The data processor may be configured to process data to characterize detected particles. For example, in some embodiments processing is implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a particle detection and characterization apparatus may implement methods as described herein by executing software instructions in a program memory accessible to the processors.

In some embodiments processing is performed by a suitable digital signal processor (DSP). The DSP may include one or more analog to digital converters operable to digitize output signals from light sensors 101 to 106. Some embodiments include a multi-core DSP and/or a firmware array configured to perform the desired data processing.

Figure 8:
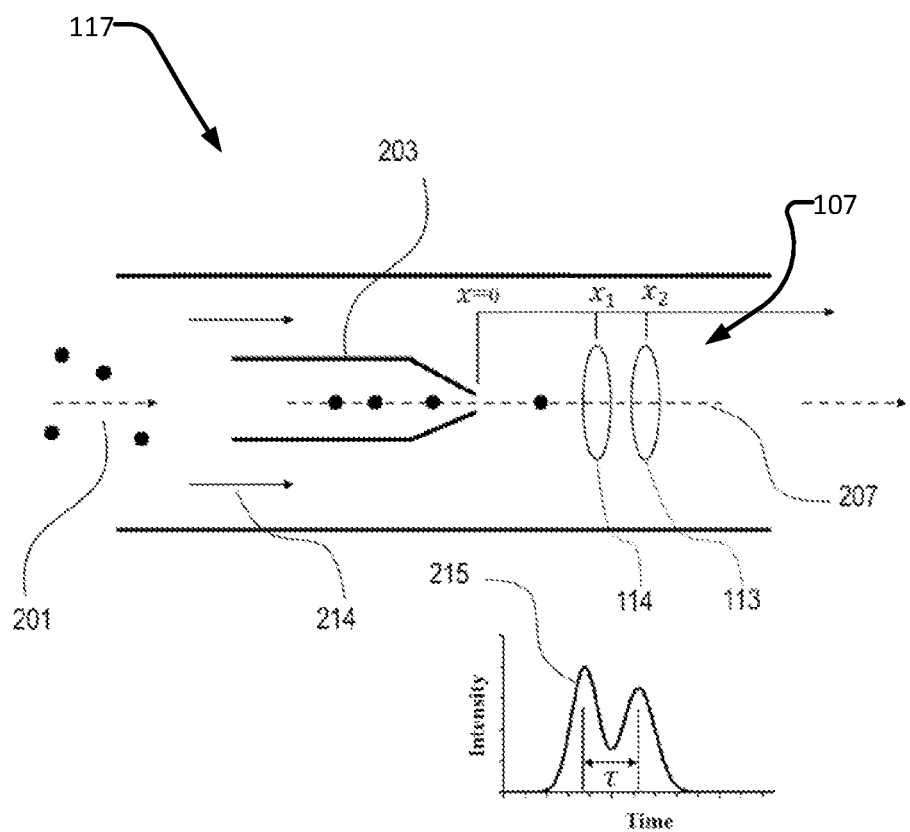
FIG. 8 is a schematic view of an example testing chamber.
Figure 9:
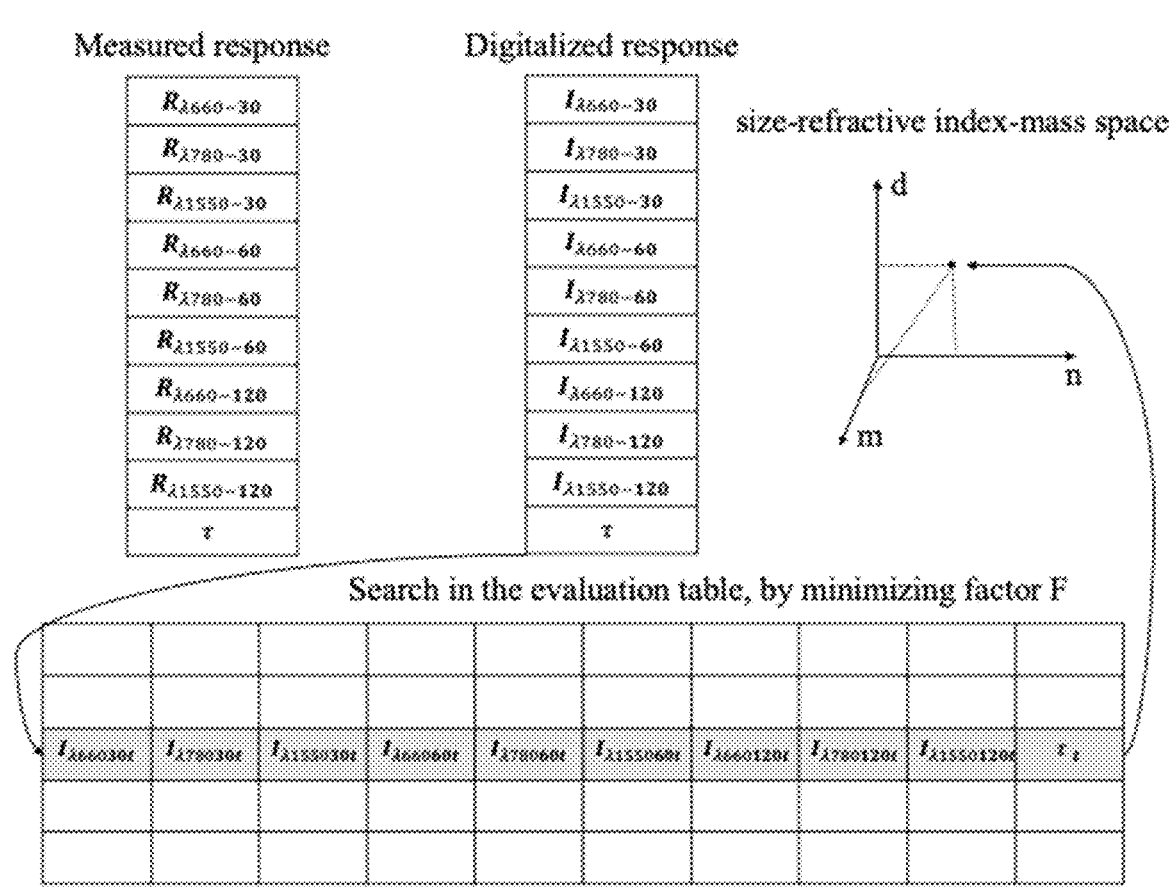
FIG. 9 illustrates the data flow in an example method for particle discrimination using outputs of the light sensors of the apparatus of FIG. 7.

FIG. 8 is a schematic, not to scale illustration showing an example testing chamber 117 that includes sampling volume 107. Testing chamber 117 is shown in isolation. In some embodiments, apparatus as shown in FIG. 7 or FIG. 9 includes a testing chamber 117 like that shown in FIG. 8.

An aerosol to be sampled containing particles 201 is accelerated by means of a nozzle 203 and directed to travel in a stream from an output of nozzle 203 through sampling volume 107 along a plane 207. Plane 207 is perpendicular to the surface of the page in FIG. 8. In sampling volume 107, the aerosol stream passes through light beam 114 (e.g. visible red light) and light beam 113 (e.g. near infrared light). The rate of particle acceleration in response to the accelerated flow through nozzle 203 depends in a predictable way on particle size and density. Heavier particles (larger and denser) accelerate more slowly than lighter particles due to their larger inertia. By observing the velocities of detected particles 201 as particles 201 pass between beams 114 and 113 one can estimate the densities of particles 201.

FIG. 8 shows two light beams 114, 113 (e.g. a VisRED beam 114 and a NIR beam 113). The two beams are collimated to be separate and non-overlapping where they cross plane 207. In this example, particles 201 flowing through sampling volume 107 first encounter VisRED beam 114 beam and subsequently NIR beam 113.

FIG. 8 includes a depiction of a graph of the intensity response as a function of time for light scattered by a particle that interacts with beam 114 at time $X_1$ and beam 113 at time $X_2$. The time interval τ thus obtained is discussed below.

As understood by those conversant with the art of Mie scattering based particle detectors a pump (which is not shown for clarity) operating at a specified flowrate draws a particulate bearing aerosol stream through a sampling volume 107 also referred to as "interrogation volume" along the plane of interaction 207 where laser beams interact with particles 201.

A sheath of sheath air 214 or focusing inlet conditions prevent recirculation of sampled aerosols in sampling volume 107.

The best flowrate to use is highly dependent on the application, i.e., the particle types and suspected aerosol concentrations as well as details of construction of the apparatus being used. Ideally the aerosol is spread out sufficiently along the sampling volume 107 that it is unlikely that two different particles will cross light beam 113 or 114 simultaneously or nearly simultaneously. For a variety of applications, flow rates in the range of about 1 L/min and 5 L/min are appropriate.

FIG. 9 illustrates example data structures that may be used in the analysis and discrimination of observed particles, according to one method of the current invention. The measured responses of detectors 101-103 and 104-106 are digitized and stored in a table. The time interval τ is the measured difference between the two peaks received by the responses from detectors 104-106 and is recorded at a $10^{th}$ data point here for convenience.

The method relies on the fact that each measured particle has somewhat unique "optical fingerprint" given by signals scattered in the sampled direction at three different wavelengths.

Before applying the multi-wavelength apparatus for practical applications, an evaluation table is constructed and calibrated by simulation based on Mie theory. This may be done by discretizing the particle size range (i.e., 1-20 μm), particle refractive index (i.e., 1.4-1.6), and mass density (i.e., 1-4 g/cm$^3$) into, a number of intervals. For example, in some embodiments each of these ranges is divided into 6 to 50 intervals.

This discretization can be considered to divide a size-index of refraction—mass space into cells. For example, for the case where each of these ranges is divided into 40 equal intervals any particle having properties within the discretized ranges may be fit into one of 40×40×40=64000 cells.

Simulations may be performed to determine how particles having properties corresponding to each of these cells would scatter light of each of a plurality of wavelengths through each of a plurality of different angles as well as what value of the time interval τ would be expected. As long as enough different wavelengths of light and enough different scattering angles are considered, each cell may correspond to a unique signature that can be distinguished from signatures of all other ones of the cells. The time interval τ is related to the aerodynamic diameter of a particle observed, the aerodynamic design of the testing chamber 117 and the separation (e.g., 200 μm) between beams that detect the particle. The simulated results are saved in the table.

Each detector 101-106 is able to measure the scattered light flux. For a linearly polarized laser beam irradiating a particle from one direction, the response is given by:

$$R_{\lambda\theta} = \frac{\lambda^2}{4\pi^2} \int_{\theta_1}^{\theta_2} (I_1(x, n, \theta) + I_2(x, n, \theta)) G(\theta) d\theta$$

where λ denotes the illumination wavelength (e.g., 600 nm, 780 nm, 1550 nm). θ is the scattering angle. $I_1$ and $I_2$ are scattered light intensities polarized parallel and perpendicular relative to the plane of oscillation of the electric vector of the incoming radiation. The refractive index n and the dimensionless particle size parameter x defined by x=πd/λ with d being the particle diameter. G(θ) is a geometrical factor which depends on the specific optical design. $\theta_1$ and $\theta_2$ are the truncation angles limiting the solid angle in which the scattered light is collected.

The size-refractive index-mass vector space illustrates the relationship of the particle size d, the refractive index n and the mass m.

In an example embodiment the measured signal responses from a sample particle are converted into nine digitized responses in a table using a scale factor obtained experimentally. This factor is calibrated to correlate the simulation results to experimental results. This set of 9 numbers representing the particle's scattered light intensity is then compared with a pre-computed table obtained by means of Mie theory. The table has 10 columns. Each row may be calculated for a particle with given size, refractive index, and mass density. Note that in the illustrated example the $10^{th}$ column τ is only dependent on the particle mass density. This factor is not relevant to the scattered intensities, should be considered separately but, for convenience it appears in the $10^{th}$ column.

The evaluation table is then searched for a best match against the measured data set to determine particle size, refractive index, and mass density simultaneously, as shown in the size-refractive index-mass density space.

One method to determine the optimum match of the measured scattered intensities and the time interval τ to the simulated calculated values is to compare the actual collected scattered light to the theoretical scattered light that is pre-calculated using digitalized bins of particle diameter, refractive index, and mass density. In order to find the best match, one can define an evaluation parameter F, which describe the difference between the practical and theoretical light scattering on each detector. One example way to define F is:

$$F = \sum_{k=1}^{N} \left\{ \frac{1}{I_{ti}} |I_i - I_{ti}| \right\}$$

where N is the number of detectors used, in the present example, 9, $I_i$ and $I\tau_i$ are the measured and theoretical calculated scattered intensities at specific wavelengths and angles.

A minimized F parameter value indicates good agreement between the actual and theoretical light scattering, signifying a preferred result. Dependent on the accuracy and confidence level of each detector, we can add a weighting factor in order to optimize this data processing procedure. It is easy to rationalize that by increasing the number of rows of the evaluation table, we could increase the numerical resolution in terms of size and complex refractive index.

Figure 10:
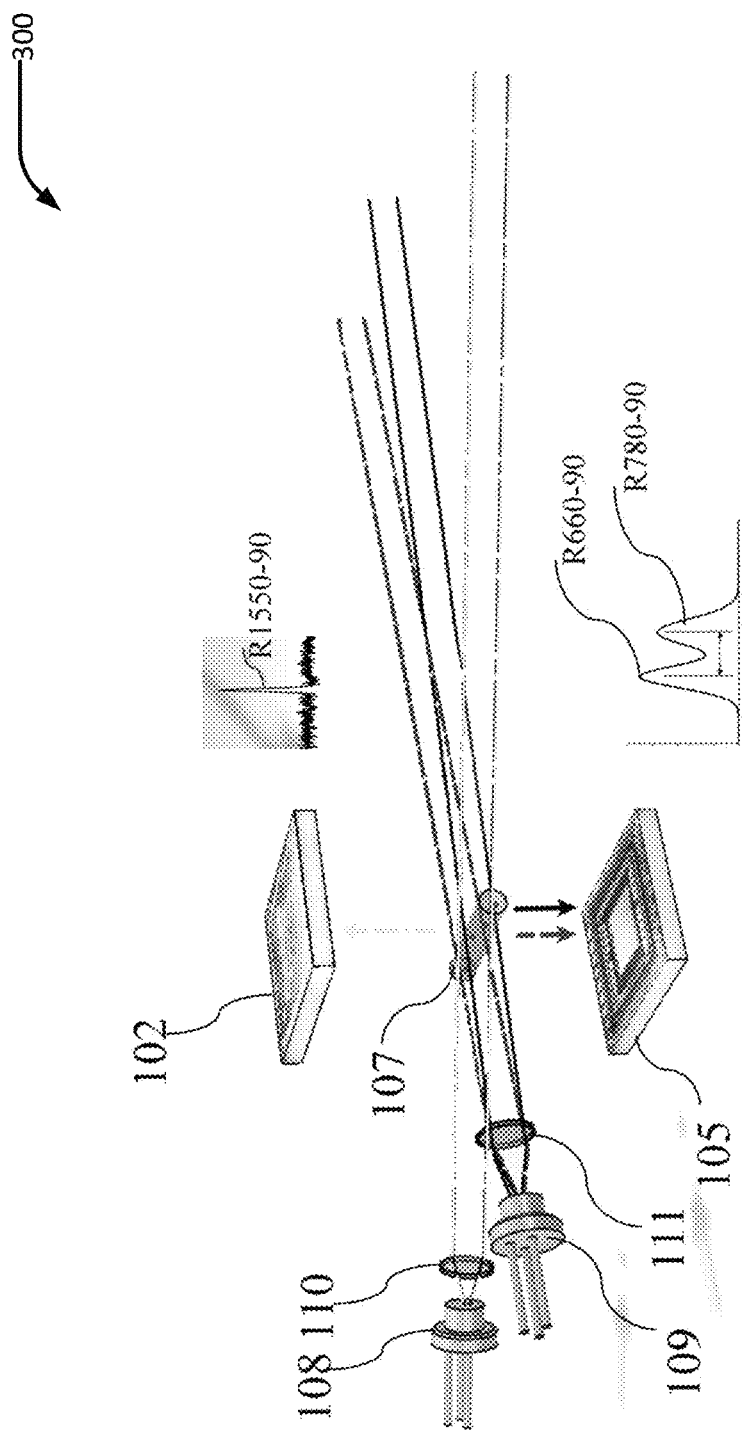
FIG. 10 is a schematic view of an example apparatus according to an embodiment of the current invention which uses light of three wavelengths and includes two light detectors.

Practical differentiation between only two particle types (e.g., distinguishing active pharmaceutical ingredient (API) particles from background) may be performed using fewer detectors than are provided in apparatus 100 of FIG. 7. FIG. 10 shows an example apparatus 300 which, like apparatus 100 of FIG. 7 provides light beams having three different wavelengths but only includes two detectors. Elements common between apparatus 300 and apparatus 100 have the same reference numbers.

Apparatus 300 includes one light detector 102 operable to detect light of longer wavelengths (light detector 102 may, for example be a InGaAs light detector) and one light detector 105 operable to detect light of shorter wavelengths (light detector 105 may, for example be a silicon light detector). In the illustrated embodiment, light detectors 102 and 105 are configured to detect light that is scattered at an angle of about 90 degrees to the corresponding light beams. FIG. 10 shows simulated waveforms for each of detectors 102, 105.

Figure 11:
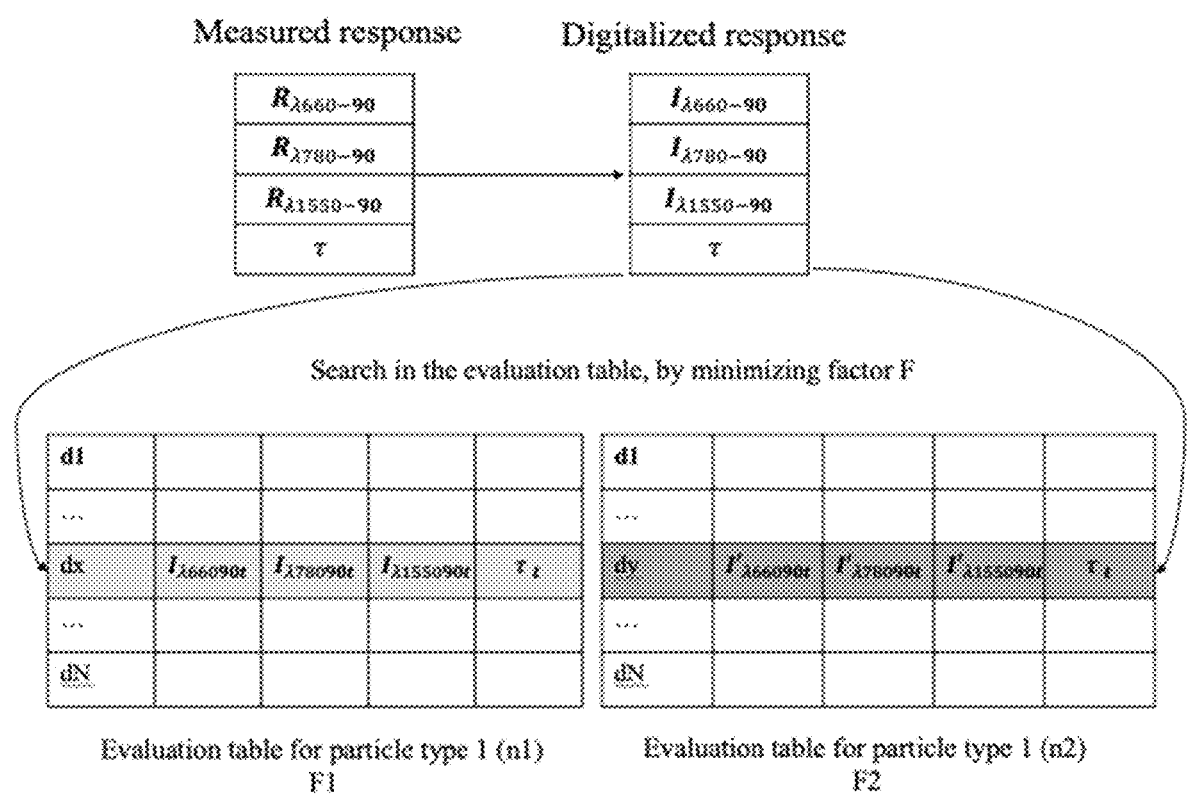
FIG. 11 illustrates data flow in an example method for particle discrimination using outputs of the light sensors of the apparatus of FIG. 10.

FIG. 11 illustrates a data flow for a method of analyzing outputs from detectors 102 and 105 of apparatus 300. Outputs of sensors 102 and 105 are digitized. The digitized signals are processed to detect pulses corresponding to light scattered by individual particles. Amplitudes of the pulses are stored in a response table. Three pulses correspond to each detected particle. One of the three pulses corresponds to scattering of light of each of the three wavelengths. In the illustrated embodiment each row of the response table also includes a digitized value for the time interval τ measured from the responses of detector 105. In this embodiment there are only four items per particle recognition from the two detectors 102 and 105.

In one application of apparatus 300, it is desired to differentiate particles that have different refractive indices (i.e., n1, n2). Simulated scattering intensities are pre-calculated for two particle types F1 and F2 which have refractive indices n1 and n2 respectively. The simulations are performed for a number of discrete particle sizes and for each of the wavelengths of light of the light beams of apparatus 300.

Particle sizes within a range (e.g. 1 to 20 μm) may be discretized into N bins (d1, ..., dx, ... dN). In this example, the simulated scattering intensities are presented in look-up tables.

Data for each detected particle (e.g. for each row of the response table) is compared to the lookup tables with the goal of determining the type and diameter for each detected particle by finding the row of the lookup tables that is the best match to the response data for the particle. This may be done, for example, by minimizing a matching function such as, for example the factor F which is described above.

In an example embodiments a best match to the response data is found in each of the lookup tables. For example a best matching row in a first lookup table (for the case of particles having a first refractive index) may have a matching function value F1 and a best matching row in a second lookup table (for the case of particles having a second refractive index) may have a matching function value F2. One of these matches is identified as best representing the detected particle.

The minimized factors F1, and F2 correspond to two different particle sizes and refractive indices ((dx, n1) or (dy, n2)). To determine which of these best represents the detected particle various strategies are possible.

One approach is to select the match which has the closest match according to the matching function (e.g. the smaller value of function F). For example, if F1 is smaller than F2, then one could say that the detected particle is best represented by diameter dx and refractive index n1.

In some cases the values of F1 and F2 may be very close. In such cases it may be unreliable to categorize a particle based on which one of F1 and F2 is smallest. In such cases, time of flight (e.g. as represented by the time interval T may be used to determine which set of parameters best match the detected particle. In this situation using the time-of-flight measurement to make a better choice. Particle aerodynamics are strongly affected by particle size. The time-of-flight measurement depends on aerodynamics of the particle and could be used to determine which of the two best matching sets of parameters best represents the detected particle.

In some embodiments, if the difference between F1 and F2 exceeds a threshold then the choice of which of the two best matching sets of parameters best represents the detected particle is made based on whichever one of F1 and F2 is smallest. If the difference between F1 and F2 does not exceed the threshold then the choice of which of the two best matching sets of parameters best represents the detected particle is made based on whichever one of the two best matching sets of parameters predicts a time of flight that most closely matches the time of flight for the detected particle.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms. These terms ("a", "an", and "the") mean one or more unless stated otherwise;
"and/or" is used to indicate one or both stated cases may occur, for example A and/or B includes both (A and B) and (A or B);
"approximately" when applied to a numerical value means the numerical value ±10%;
where a feature is described as being "optional" or "optionally" present or described as being present "in some embodiments" it is intended that the present disclosure encompasses embodiments where that feature is present and other embodiments where that feature is not necessarily present and other embodiments where that feature is excluded. Further, where any combination of features is described in this application this statement is intended to serve as antecedent basis for the use of exclusive terminology such as "solely," "only" and the like in relation to the combination of features as well as the use of "negative" limitation(s)" to exclude the presence of other features; and
"first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:
in some embodiments the numerical value is 10;
in some embodiments the numerical value is in the range of 9.5 to 10.5;
and if from the context the person of ordinary skill in the art would understand that values within a certain range are substantially equivalent to 10 because the values with the range would be understood to provide substantially the same result as the value 10 then "about 10" also includes:

in some embodiments the numerical value is in the range of C to D where C and D are respectively lower and upper endpoints of the range that encompasses all of those values that provide a substantial equivalent to the value 10

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for detecting or characterizing particles in aerosols, the apparatus comprising:
    a testing chamber;
    a nozzle arranged to direct an aerosol stream to flow along a path in the testing chamber;
    a light source operable to emit first and second beams of light which are respectively directed to illuminate the path at first and second spaced apart locations, the first and second beams respectively comprising light of first and second different wavelengths;
    at least one light detector configured to detect light scattered by one or more particles in the aerosol stream as the one or more particles pass through the first and second beams of light; and
    a data processor configured to process an output of the at least one detector to detect or characterize the one or more particles in the aerosol stream;
    wherein the at least one detector comprises a first plurality of detectors arranged to detect light from the first and second beams of light that is scattered at a corresponding plurality of different scattering angles by particles in the aerosol stream;
    wherein the data processor is configured to compare measured data against simulated data to determine properties or characteristics of the one or more particles;
    wherein the simulated data comprises one or more evaluation tables and comparing measured data against the simulated data comprises searching each of the one or more evaluation tables for a best match against the measured data to determine particle size, refractive index or mass density of the one or more particles.

2. The apparatus of claim 1 wherein the first plurality of detectors comprises a first detector positioned to detect light scattered at a scattering angle of about 30 degrees, a second detector positioned to detect light scattered at a scattering angle of about 90 degrees and a third detector positioned to detect light scattered at a scattering angle of about 120 degrees.

3. The apparatus of claim 1 wherein the first beam of light comprises red visible light and the second beam of light comprises near infrared light.

4. The apparatus of claim 3 wherein the first beam of light has a wavelength of about 660 nm and the second beam of light has a wavelength of about 780 nm.

5. The apparatus of claim 1 wherein the first and second locations are spaced apart by a distance in the range of about 100 µm to about 1000 µm.

6. The apparatus of claim 1 comprising a third light source operable to emit a third beam of light directed to illuminate the path of the aerosol stream wherein the third beam of light comprises light having a longer wavelength than light of the first and second beams of light.

7. The apparatus of claim 6 comprising at least one additional detector configured to detect light from the third beam of light that is scattered by particles in the aerosol wherein the additional detector is sensitive to the light of the third beam of light and insensitive to the light from the first and second beams of light and the data processor is configured to detect or characterize the one or more particles in the aerosol stream based at least in part on an output of the at least one additional detector.

8. The apparatus of claim 7 wherein the at least one additional detector comprises a second plurality of detectors arranged to detect light scattered by particles in the aerosol stream at a corresponding plurality of scattering angles.

9. The apparatus according to claim 8 wherein each of the first plurality of detectors and each of the second plurality of detectors is respectively operative to detect light scattered by the particles of the aerosol stream into a corresponding range of scattering angles which spans 2 to 8 degrees.

10. The apparatus according to claim 8 wherein each of the detectors of the second plurality of detectors has a planar light detecting surface that is oriented parallel to a direction in which the third beam of light is incident on the path of the aerosol stream.

11. The apparatus according to claim 1 wherein each of the detectors of the first plurality of detectors has a planar light detecting surface that is oriented parallel to directions in which the first and second beams of light are incident on the path of the aerosol stream.

12. The apparatus of claim 1 wherein the data processor is configured to search the one or more evaluation tables for the best match by minimizing a matching function value over the evaluation tables.

13. The apparatus of claim 12 wherein the matching function incorporates a weighting factor representing an accuracy and confidence level for each of the one or more first detectors.

14. The apparatus of claim 12 wherein the best match corresponds to the match with the smallest matching function or is at least in part selected based on time of flight measurements.

15. The apparatus of claim 1 wherein the data processor is configured to determine particle statistics for the aerosol stream including one or more of: a size distribution of particles in the aerosol stream, a density distribution of particles in the aerosol stream, and an index of refraction distribution of particles in the aerosol stream.

16. Apparatus for detecting or characterizing particles in aerosols, the apparatus comprising:

a testing chamber;
a nozzle arranged to direct an aerosol stream to flow along a path in the testing chamber;
a light source operable to emit first and second beams of light which are respectively directed to illuminate the path at first and second spaced apart locations, the first and second beams respectively comprising light of first and second different wavelengths;
at least one light detector configured to detect light scattered by one or more particles in the aerosol stream as the one or more particles pass through the first and second beams of light; and
a data processor configured to process an output of the at least one detector to detect or characterize the one or more particles in the aerosol stream;
wherein the at least one detector comprises a first plurality of detectors arranged to detect light from the first and second beams of light that is scattered at a corresponding plurality of different scattering angles by particles in the aerosol stream;
wherein the first plurality of detectors comprises a first detector positioned to detect light scattered at a scattering angle of about 30 degrees, a second detector positioned to detect light scattered at a scattering angle of about 90 degrees and a third detector positioned to detect light scattered at a scattering angle of about 120 degrees;
wherein the processor is configured to process output signals from the plurality of detectors to provide estimates of: refractive index, particle size and particle density by searching a data structure that associates sets of refractive index, particle size and particle density to a corresponding set of expected output signals to identify one of the corresponding sets of expected output signals that most closely matches the output signals from the plurality of detectors;
wherein the sets of expected output signals comprise expected times of flight for particles to pass from the first location to the second location and the data processor is configured to process the output signals from the plurality of detectors to determine a time of flight for a specific particle between the first and second location and to identify the one of the corresponding sets of expected output signals that most closely matches the output signals from the plurality of detectors based in part on comparison of the determined time of flight to the expected times of flight.

* * * * *